Feb. 23, 1937.  F. H. BATEMAN ET AL  2,071,324
TWIN ROW POTATO PLANTER
Filed April 7, 1934   5 Sheets-Sheet 1

Inventors
Frederic H. Bateman
Isaac Trolley

By Walter W Burns
Attorney

Inventors
Frederic H. Bateman
Isaac Trolley
By Walter W. Burns
Attorney

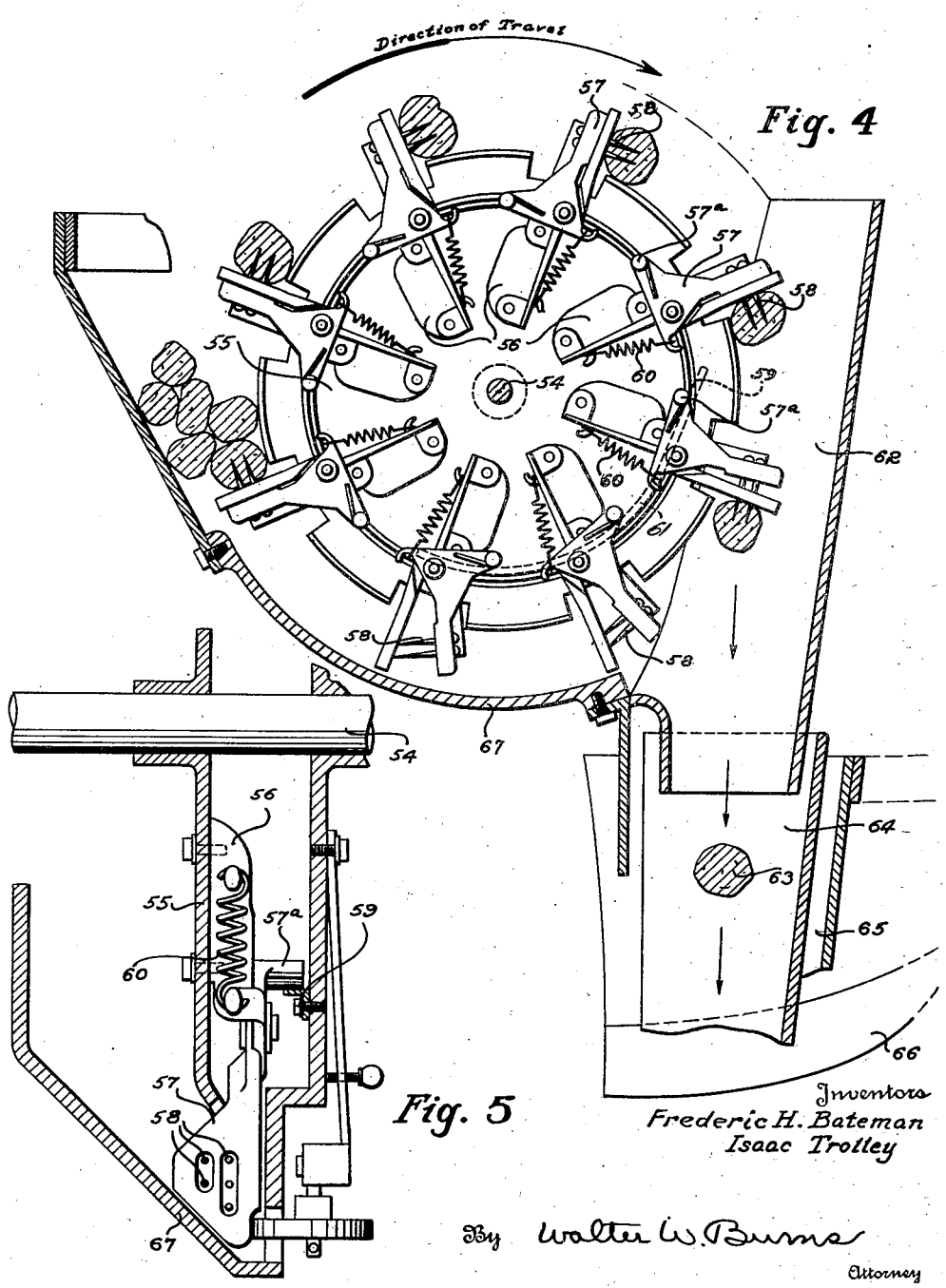

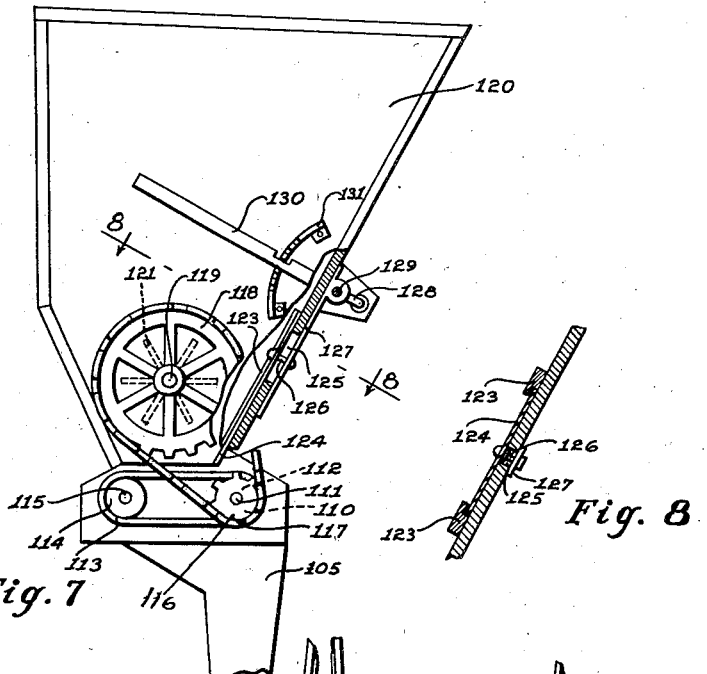
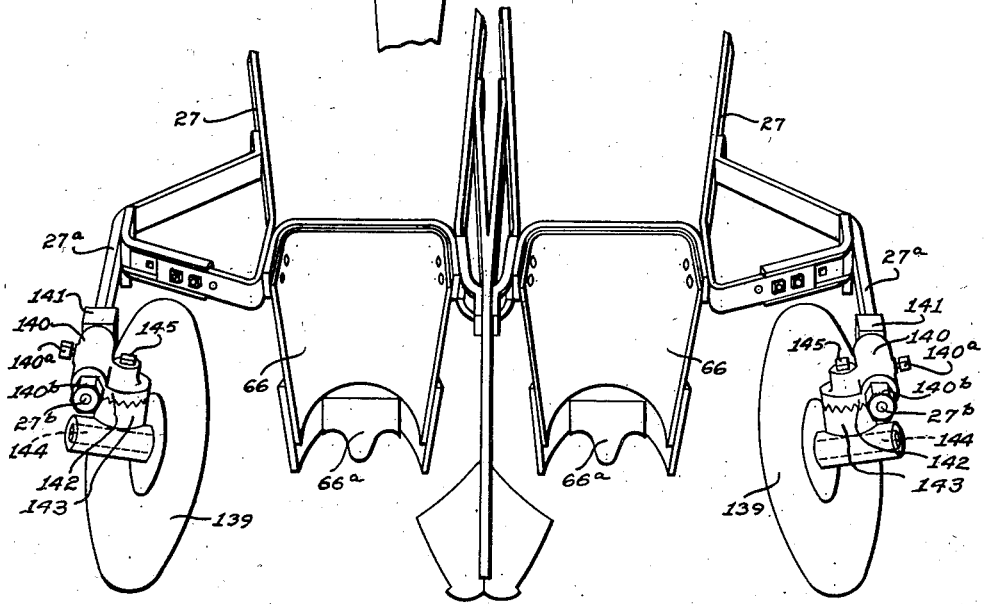

Patented Feb. 23, 1937

2,071,324

UNITED STATES PATENT OFFICE 2,071,324

TWIN-ROW POTATO PLANTER

Frederic H. Bateman and Isaac Trolley, York, Pa., assignors to Fred H. Bateman Company, Camden, N. J., a corporation of New Jersey Application April 7, 1934, Serial No. 719,574

36 Claims. (Cl. 111—52)

This invention relates to potato planters and particularly relates to those planters which plant a plurality of rows relatively close together and at the same time.

We have found that when two ordinary rows of potatoes are planted by machine at the same time, and at the usual distance apart, some advantages may be gained due to the passing over the field a less number of times. There are, however, many disadvantages to such a machine. One disadvantage is that a single operator has difficulty in seeing the pickers of both rows of such a machine, at the same time.

We have also found, by experience, that in planting two rows of potatoes, for example, close together thus making twin rows and by leaving substantially the usual or greater distance between the adjacent pairs of twin rows, there are many advantages not obtained by the usual method of planting. By this latter method, there is an increased yield per acre. This is due in part to the increase in the total linear length of the planting for a given area and in part to other advantages to be set forth. This method of planting increases the amount of shade as one plant grows to meet the adjacent plants of the other adjacent row of the twin-row. This increase in the amount of shade, not only saves moisture by preventing evaporation but the shade tends to prevent weeds from growing and the soil maintains a lower mean temperature.

These two results together produce another indirect result. Since evaporation is lessened with a consequent retention of the moisture in the top of the soil, and since the growing of weeds between the rows is retarded, the cultivation of the narrow space between the close rows, is usually unnecessary after the plant has grown to a height sufficient to provide shade for the space between the rows of the twin-row.

This makes it necessary to cultivate only the wide space between rows of adjacent twin rows. Thus a saving is made in time of cultivation.

This cultivation of only one side of each row, reduces vine injury, and absolutely prevents pruning off the roots by cultivation and makes it possible to loosen the ground between the rows if it becomes hard, without injuring the crops.

This feature produces a considerable saving due to the fact that the punishment of the vines by vehicle wheels is considerably reduced if not almost entirely eliminated.

Due to the fact that the fertilizer placed between the two rows of each of the twin rows, may serve for either row depending upon the soil conditions, there is a consequent saving of fertilizer either in the amount of fertilizer used or by an increase in its efficiency or both.

During the time the potatoes are growing, there is a decrease in cost not only due to a decrease in cultivation cost but also in spraying. During the spraying operation there will be a part of the solution which is lost especially when the plants are small.

In the case of the twin rows, this loss will be very much less as the amount of spraying solution required will be only slightly more for the twin rows than for a single row.

It has been found also that this method of planting produces potatoes more nearly true to type, eliminates the dangers of oversize potatoes, especially for seed purposes and improves the quality and uniformity of the potatoes.

It has been found that the cost of harvesting of potatoes which have been grown by the twin-row method, is very much less than by the single-row method due to the fact that more potatoes are located underground in a narrower space, thus making it possible to dig the two rows of a twin-row at once with a single elevator apron.

Also, the location of more potatoes in a row after being dug, makes it easier to pick up the potatoes.

This twin-row method of planting also increases the efficiency of intercropping.

The primary objects of this invention are the provision of an improved potato planter and an improved method of planting potatoes.

Another object of the invention is the provision of an improved potato planter which will simultaneously plant two rows of potato seeds close enough together so that each may provide protecting shade for the other and to render other savings in space and increases in efficiency incident to the planting arrangement.

Still other objects of the invention are to provide a method of and means for planting twin-rows of potatoes, the plants being preferably placed in a staggered relation to provide for a maximum distance between plants for a given planting distance and row spacing.

A further object of the invention is the provision of a planter which will plant potatoes alternately in twin-rows close together as the planter passes along the rows, and at the same time will place fertilizer between the rows and on the outside.

A still further object of the invention is the provision of a planter which will simultaneously plant twin-rows of potatoes, fertilize the rows between and at each outer side of the rows and then cover the seeds and fertilizer to the required depth.

A still further object of the invention is the provision of a potato planter having an improved means for laying the fertilizer in the quantity needed at the exact place needed relative to the seed row.

Other and further objects of the invention will be apparent to one skilled in the art from a reading of the complete specification and claims.

Referring to the drawings wherein we have illustrated an embodiment of the invention, Figure 1 is a side elevation of our invention with parts broken away for clearness.

Figures 4 and 5 are detail views of the picker devices and seed delivery mechanism.

Figure 7 is a detail view partly in section illustrating the fertilizer feeding mechanism.

Figure 8 is a detail sectional view on the line 8—8 of Fig. 7.

Figure 9 is a perspective view of our seed covering disks, in a position different from that shown in Figure 2.

Figure 1:
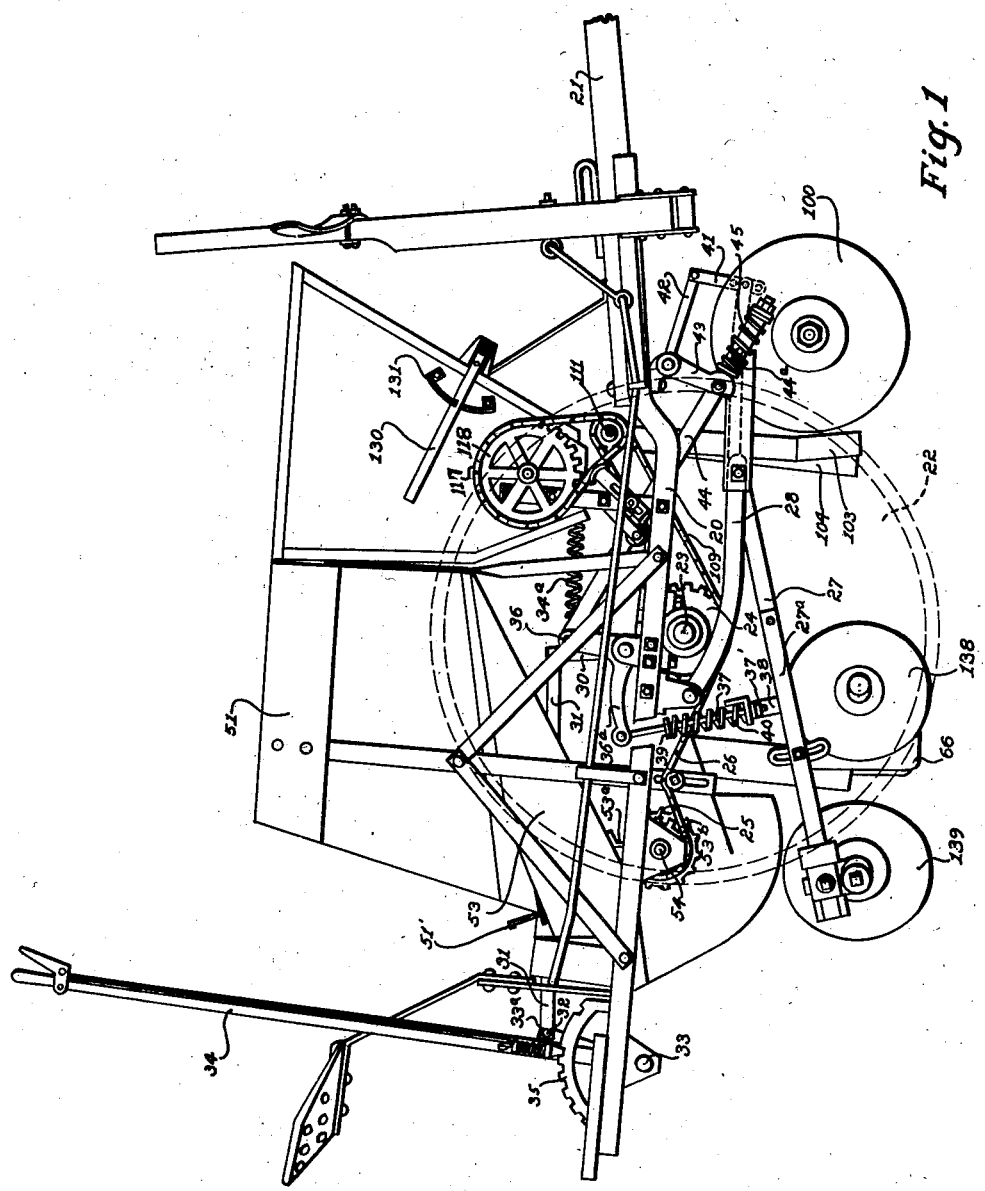
Figure 2:
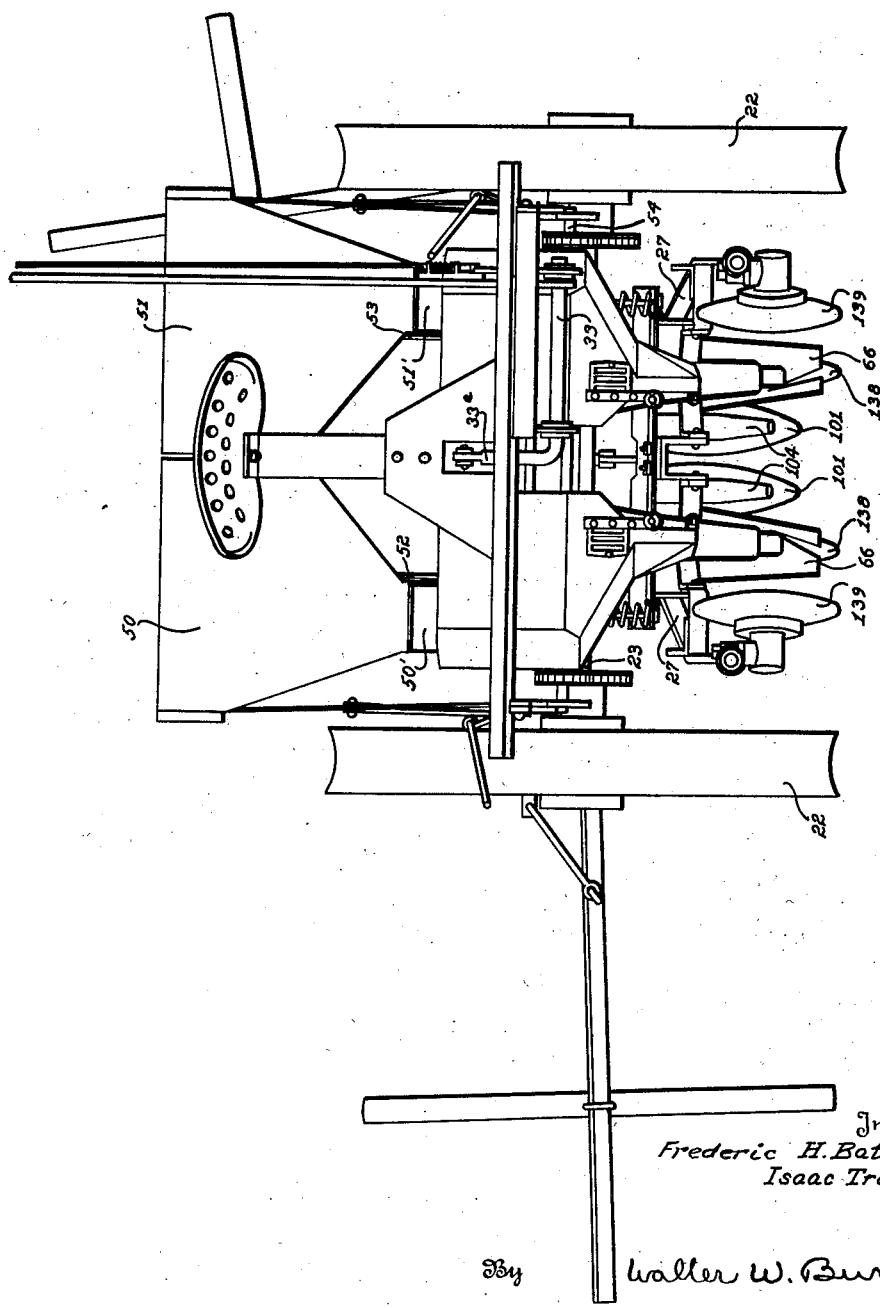
Figure 2 is a rear view.
Figure 3:
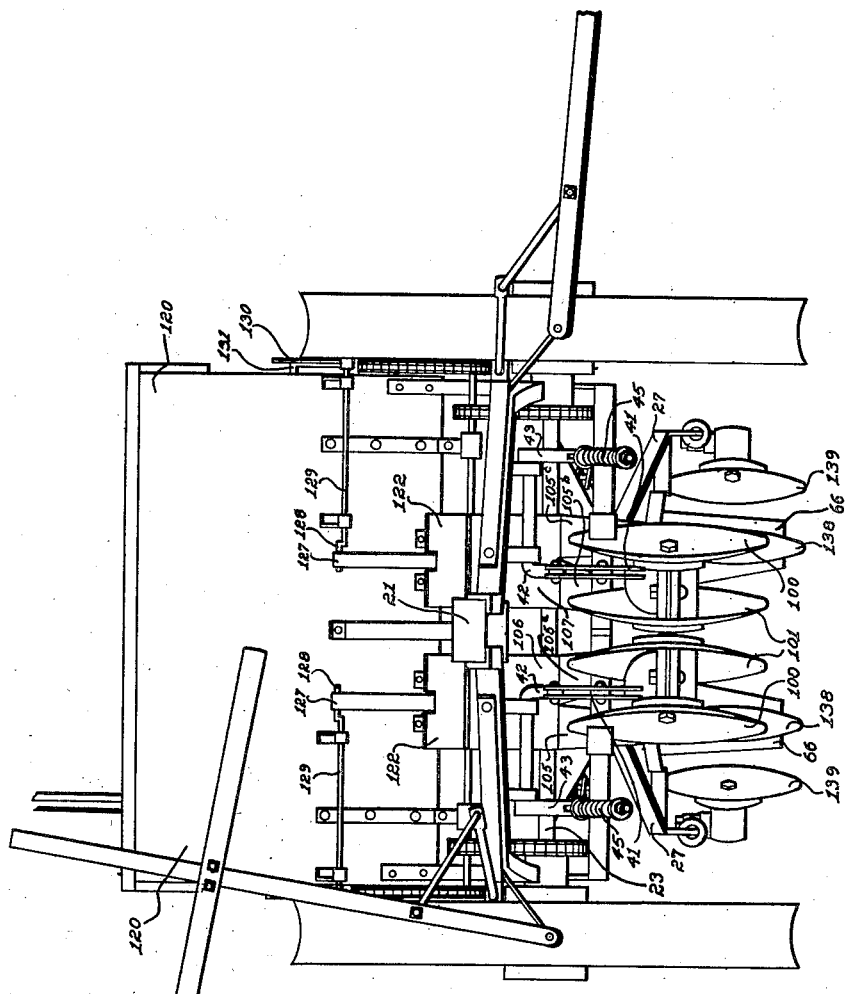
Figure 3 is a front view.
Figure 6:
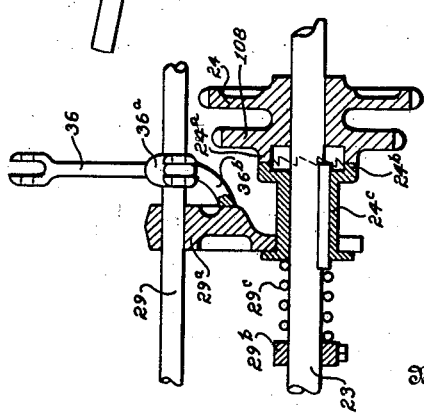
Figure 6 is a detail view of the clutch mechanism.

The construction and use of this invention is concerned in the planting of two rows of potatoes, close enough together to make the usual cultivation therebetween unnecessary and practically impossible after the plants have advanced sufficiently to provide shade. These two rows taken together, we term a twin-row for the reason that they may be treated as a single row, during planting, cultivation, spraying and harvesting.

The same reference characters refer to the same or similar parts throughout the figures of the drawings.

The reference character 20 refers to the main frame of the twin-row planter. A tongue 21 is attached at the forward end of the main frame 20 and serves as the draft member. Ground wheels 22 are pivoted on the axle 23 which latter carries sprockets 24 which drive other smaller sprockets 25 through chains 26. Adjacent each ground wheel 22 is a sprocket 24 which drives the chain 26 and the sprocket 25. The sprockets 25 are each connected to a planter device which picks up potato seeds and at desired intervals, deposits the potato seeds as will hereinafter be described.

In carrying out our invention, we have found it desirable to plant the potatoes close enough together so that as the plants grow, the roots can intermingle and so that when the plants come up, the shade of each will assist the other nearest plants, not only in the same row, but in the other row of the twin-row.

To bring these results about, we have found that goods results can be obtained by planting the rows of the twin-rows about 12 inches apart and by planting the seeds in one row about the same distance apart. These distances may be varied somewhat to suit the conditions of the particular soil and climate.

The wheels drive the axle which is provided with the usual clutches—one adjacent each wheel 22 and each clutch has a coacting sprocket 24. In this way each planting device is driven independently from the axle which is driven by both driving wheels. From the construction of the planting devices to be explained, it will be clear that, when making the turn at the end of the row, the picking devices may by the operator be made to take a staggered relation, so that when the clutches are let in, the planting operation will begin and continue in a manner to place the seeds in positions not opposite each other in the rows of the twin rows. A little care will place them in a substantially exactly spaced staggered relation. This arrangement will so place the seeds that, taking any seed, the two nearest seeds of the same row will be substantially equally distant from that seed as will be the two nearest seeds of the other row of the twin-row. This method of planting has many advantages. It places the seeds so that they will have substantially the same amount of ground in which to spread their roots, equalizes the amount of fertilizer between plants and makes the potato growth more nearly uniform.

Due to the close proximity of the rows of the twin-row, it will be clear that the ordinary methods of planting cannot be used. For this reason, it has been found to be necessary to treat the two rows of the twin-row, as one problem. In the planting operation, the deposit of and covering of the fertilizer is no less important than the proper deposit of the potato seeds. For this reason, special attention has been paid to the proper placing and covering of the fertilizer.

A floating frame 27 is connected to the main frame 20 by connecting members 28 which act as control links permitting an up and down swinging movement yet preventing undue longitudinal or lateral movement relative to the main frame 20. On the main frame 20 is mounted a shaft 29 which is moved rotatively by an arm 30 connected thereto. A link 31 connects the arm 30 with a pin 32 which is connected to a bell crank 33ª of a shaft 33. This shaft is operated by a hand lever 34 which is held in adjusted position by a suitable segment 35 and coacting dog on the hand lever 34.

The shaft 29 carries a bell crank lever 36 having forwardly and rearwardly extending arms.

The rearwardly extending arm 36ª carries a link 37 which at its lower end carries a nut 37'. This link 37 passes through an angle bracket 38 which is mounted on the floating frame 27. The nut 37' engages the lower side of the angle bracket 38 when the link 37 is used to lift the planter mechanism clear of the ground.

A collar or other stop device 39 is mounted on the link 37 at a suitable place to maintain a proper compression in the spring 40. During operation, the spring 40 maintains the planter in proper relation to the ground. The nut 37' may be adjusted to make any desired permanent adjustment while the adjustment of the lever 34 on its segment 35 will cause any desired variation in the height of the frame 27 during operation. It is to be understood that we provide one of these lifting devices with a link 37 and its cooperating parts on each side of the floating frame 37.

At the forward end of the floating frame 27 and at each side, are adjustable links 41 which at their upper ends are connected to bell crank levers 42. The bell crank levers 42 are provided at their outer ends with downwardly extending arms 43. These arms 43 are split at their lower ends and each receives a slotted link member 44. On the ends of the links 44 are springs 45 which are held in compression and normally tend to press the frame 27 downwardly through the coaction of the bell crank lever 42 and its coacting parts. The slots 44ª permit relative movement between the rod 44 and the pivot connected to the lower end of the downwardly extending arm 43. When tension is placed in the rods 44, the springs 45 cause, through the bell crank levers 42, a downward movement of the links 41 to press the forward end of the frame 27, with its earth-engaging parts, toward the ground. It is thus clear that the movement of the lever 34 in a forward direction raises both ends of the frame 27 while the movement of the lever 34 in a rearward direction will cause a movement of the frame 27 as a whole with its earth-engaging parts, toward the ground.

The planting devices proper are fed with seed potatoes from twin hoppers 50, 51, arranged close together. These hoppers empty into chutes 52, 53, which conduct the potato seed to the picker mechanism driven from the sprocket 25.

The chutes 52, 53 are pivoted at their upper ends to their respective hoppers 50, 51 and adjacent their lower ends carry supporting brackets as 53ª which rest upon a jarring wheel 53ᵇ mounted on the shaft 54 which operates the picker mechanism. The function of the chutes 52, 53 is to deliver the potato seeds from the hoppers 50, 51 to the picker mechanism. The jarring wheel 53ᵇ is constructed with a series of cam surfaces at its periphery. The bracket 53ª which supports the chute 53' is held by gravity in contact with the jarring wheel 53ᵇ and is so positioned that the chute 53 will be dropped a short distance when the bracket 53ª leaves the edge of a cam or periphery of the wheel 53ᵇ, which action is immediately followed by a similar action of the next following cam of the jarring wheel 53ᵇ. This alternate raising and dropping of the chutes 52, 53 causes a constant agitation of the potato seeds with the result that the seeds are continuously delivered to the pickers. Adjacent the bottom of each of the hoppers is a sliding gate 50', 51'. The adjusted height of these gates is controlled at will and determines the volume of potatoes delivered during any given time. The adjustment of the gates 50', 51' is made by the operator to maintain the seeds to the desired depth around the picker arms as the arms pass into the back of the seed chamber and emerge, each with a seed to be delivered into the planting shoe.

This picker mechanism will now be described. As the lever 34 is moved rearwardly to lower the frame 27, suitable clutch mechanism operatively connects the axle 23 to the shaft 54 on which is mounted the sprocket 25. This connection is made through the sprocket 24 and the chain 26. On the shaft 54 is mounted a picker disk 55 upon which are located pickers for picking up the seed potatoes and at the proper time releasing them for planting. These pickers comprise a main arm 56 which is secured to the picker disk 55 and extends beyond its periphery. In the form illustrated there are eight such main picker arms about the periphery of the picker disk. A pivoted auxiliary arm 57 is mounted on the main picker arm 56 and has sharp picker fingers 58 which extend through openings in the main picker arm 56. These pivoted fingers 58, as they approach the bottom of their path of travel, are retracted by the coaction between the extension 57ª of the arm 57 and the cam 59. When the arm extension 57ª passes beyond the cam 59, the spring 60 causes the fingers 58 to quickly return to their normal extended position. This quick return movement causes the sharp fingers 58 to pierce one of the seeds which is then carried on up and over the top of the periphery and downwardly until the arm extension 57ª engages the discharge cam member 61. This discharge cam member coacts to withdraw the sharp fingers from the seed, the outer end of the arm 56 causing the seed to drop into the guard 62.

The guard 62 is open at its rear to receive the picker arms and at its bottom to discharge the potato seed as at 63. The seed then passes into a tube 64 which has its support in the boot 65 of the shoe 66. The seed has a clear opening from the picker discharge point to the ground where it is deposited in the opening made by the shoe 66.

It is to be noted that the planting mechanisms are placed close together and that the potato seeds are fed at the outsides of the picker disks 55.

The two twin picker mechanisms are duplicates except that one is constructed left-handedly relative to the other in order to place the picker arms close enough together to have the seeds drop to the desired position in the ground when released. Thus in the illustrated embodiment of our invention, the seed potatoes pass down at the outside of the picker disks 55 to be engaged by the pickers during the planting operation. As the seeds approach the bottom of the casing 67, they pass between the picker arms and are pierced by the fingers, carried up and over the top to be discharged on the downward movement.

At the forward end of the twin planter, in planting potatoes, it is essential that the fertilizer be deposited within the soil and at the proper distance from, but out of contact with the potatoes. It has been found to be more desirable that the fertilizer be first deposited within the ground and then the planting operation executed immediately thereafter. Because of the fact that in planting a twin row, it is necessary to have the two rows planted close together, a special problem in the deposit of the fertilizer presents itself.

In the embodiment herein illustrated, we have disclosed a structure wherein four rows of fertilizer are deposited; one row on the outside of each row of the twin row and two rows of fertilizer between the two rows of the twin row. If found to be desirable, the two inner rows of fertilizer might be deposited so close together that they would form a single row or a single wide row might be deposited between the rows. These conditions would, of course, be varied with the particular soil conditions.

Secured to the forward end of the frame 27 are located four disks the outer two of which we have designated with the reference character 100 and the inner two we have designated with the reference character 101. It will be noted that the forward edges of these disks are pointed inwardly and that the concave portions of the disk face outwardly. During the planting operation, this positioning of the disks causes a double furrow to be made on each side of the center line of the machine. Securely attached to the frame 27 immediately in the rear of each disk 100 and 101 is secured a conveying tube. The tubes in the rear of the disks 100 we have designated 103 and the tubes in the rear of disks 101 we have designated 104. These tubes are preferably slightly inward of the plane which passes through the periphery of the respective disks and the tubes are so designed that they are slightly smaller at the bottom.

The mouth of the tube at the bottom is at a height slightly above the bottom of the disk and in such a position that fertilizer will be deposited in the opening as soon as the opening is made at the bottom of the disk. With this construction, any movement up or down which is made by the disk and the frame 27 will cause a corresponding movement up or down of the bottom of the conveying tube. Thus insures the delivery point of the fertilizer as being immediately at the point where the bottom of the furrow is open. The rearward portions of the mouths of the conveying tubes 103 and 104 are slightly higher in elevation than the forward portion of the mouth. This insures the fertilizer remaining in an undisturbed position until the covering operation takes place.

Observation of this showing at this particular point will make it clear that two outer furrows for the delivery of fertilizer through the tubes 103 which are made by the disks 100, are closed immediately over the fertilizer by the inner disks 101 as they make their furrows for deposit of fertilizer through the conveying tubes 104.

For the purpose of delivering fertilizer to the conveying tubes 103 and 104, we provide spouts 105, 105a, 105b and 105c. These spouts 105, 105a, 105b and 105c are connected to the fertilizer distributors which will now be described.

The upper and receiving ends of spouts 105, 105a are connected to the manifold 106 and the spouts 105b, 105c are connected to another manifold 107. The manifolds 106 and 107 are connected to distributors which are placed side by side on the forward portion of the machine and which are identical in construction except that one is arranged for the right side of the machine and the other for the left side of the machine.

Beside the sprocket 24 and on the shaft 23 is a sprocket 108 which through the chain 109 operates the sprocket 110. The sprocket 110 is mounted on the shaft 111 which latter operates the conveyor feeder for the fertilizer distributor about to be described. On the shaft 111 is mounted a drum 112 which carries the forward portion of an endless carrier 113, the rear end being mounted on the drum 114 which is carried by the shaft 115. On the end of each of the shafts 111 is a sprocket 116 which is connected by the chain 117 to a large sprocket 118. This sprocket 118 is mounted on a shaft 119 which latter carries an agitator within the fertilizer hopper 120. This agitator is designated 121 and has suitable plates which agitate the fertilizer within the hopper and cause the fertilizer to be constantly evenly delivered to the endless belt 113.

The endless belt 113 is constructed of canvas or any similar suitable material and is of a width substantially equal to the width of the manifold 107.

In the actual use of planters in the field, it has been found that different soil conditions exist in the same field. These different soil conditions require the delivery of different amounts of fertilizer in order to produce the desired results. For example, at the top of a knoll the top soil which would normally be present may have been washed away and deposited in the lower portions of the field.

For this reason unless more fertilizer is delivered at the top of the knolls than at the bottom of the depressions, the low portions of the field will be overfertilized and the higher portions will be underfertilized.

To meet these conditions we provide a gate which may be raised and lowered at will, in order that the amount of fertilizer moved from the hopper 120 may be varied at the will of the operator and in accordance with the field conditions. The shaft 111 is located forward of the plane of the forward face of the hopper 120. The drum 112 and the forward portion of the endless conveyor 113 is covered by an inspection plate 122. This inspection plate is pivoted at its upper edge to the forward face of the hopper 120. This forward face of the hopper 120 contains an opening for the conveyor belt 113 and the upper edge of this opening is located a sufficient distance above the conveyor belt 113 to provide for the maximum amount of fertilizer which would ever be desirable to deliver in the course of planting. On the inner side of the forward face of the hopper 120 are located guides 123 in which slide a gate 124. A slot 125 is provided in the forward face of the hopper 120 to permit movement of a bolt 126 which is secured at its rear end to the gate 124. At the outer end of the bolt 126 is attached a strap 127 which strap is connected to a bell crank 128 of the bell crank lever 129.

At the end of each of the bell crank levers 129 is located an operating lever 130 which when moved will transmit its movement to the gate 124 and raise and lower the latter as desired. The positions of the lever are calibrated so that the operator will know at all times the rate of fertilizer per acre being deposited.

In order to adjust the gate in the desired position, a rack 131 is provided for engagement of the operating lever 130. This operating lever is within reach of the operator riding on the machine and through its change in position is controlled the amount of fertilizer which is delivered to the manifold 106 and from there to the ground through the conveying tubes 103 and 104.

It is to be noted that the conveyor belt 113 travels at a uniform rate of speed when the manually operated clutch is thrown in and that for any particular setting of the operating lever 130, the same amount of fertilizer will be delivered for each foot of ground travel. By placing the lever 130 at a higher point on the rack 131, more fertilizer may be delivered and conversely by lowering the position of the operating lever 130 a less amount of fertilizer is delivered from the hopper 120.

It has been found that this particular type of instantaneous control renders fertilizer distribution more easily controlled and without stopping the progress of the machine. In this way not only is there a production of a more uniform product but much time is saved by having the fertilizer delivery under control of the operator without stopping the machine.

The fertilizer having been delivered just as the furrow is opened by the respective disks 100 and 101, the outer lines of fertilizer will be immediately covered by the disks 101 as already described.

Following immediately in the rear of the pairs of fertilizer conveying tubes 103, 104 and traveling in a line midway between the two tubes of each pair is the shoe 66.

Mounted on the outside of each shoe 66 is a disk 138 the forward edge of which is substantially in the plane of the forward edge of the shoe 66. The disk 138 and the shoe 66 open up a path and furrow for the planting of the seeds and at the same time the inside of the shoe 66 covers up the fertilizer deposited through the inside conveyor tubes 104.

On Fig. 9, I have illustrated in perspective, the shoe 66 with its coacting parts in relative position but with many parts broken away for clearness. In this modification, the shoe 66 carries at its lower edge, a wedge 66ª, which extends below the shoe and will make a small groove in the soil into which the seeds are deposited. The size of the wedge is such as to make a groove into which the seeds will fall and be held without rolling movement. When the wedge is used, the disk 138 may be omitted if desired.

Rearwardly of the shoes 66 and outwardly thereof on each side is located a covering disk 139 which removes sufficient soil from two sides from the twin furrow made by the disks 100, to cover the respective rows of potato seeds so that both of the rows of the twin row are covered simultaneously.

The tension of the springs 40 and 45 and the relative heights of the forward and rear ends of the frame 27 with their cooperating parts, are such that the fertilizer conveying tubes 103, 104 deposit the fertilizer at a level which is substantially the level of the bottom of the seed groove made beneath the boot 66. In this way, the fertilizer rows are equally spaced at the side from the seed row and substantially level, above or below the seed.

To provide the driving connection from the drive shafts 23 which are driven by the respective wheels, we have provided a clutch device which is operated when the shaft 29 is rotated by the movement of the lever 34 as already described. Integral with the gears 24 and 108 is a clutch member 24ª which registers with a coacting clutch member 24ᵇ. The clutch member 24ª and the gears 108, 24 are freely rotatable about the shaft 23 but are suitably held against endwise movements by coacting parts. As the wheels 22 are mounted on the shaft or axle 23 to rotate together and as the clutch member 24ᵇ is slidably keyed to the shaft 23, it is clear that rotation of the shaft 23 will cause rotation of the gears 24, 108 when the clutch members 24ª, 24ᵇ are engaged. The clutch member 24ᶜ has a groove engaged by a yoke of a yoke member 29ª which latter is slidably mounted on the shaft 29. A collar 29ᵇ holds one end of a compression spring 29ᶜ to normally force the sliding yoke member 29ª in a direction to cause the clutch members to become engaged.

Integral with the lever 36 and its arm 36ª, is a cam member 36ᵇ which extends to a position to engage the sliding yoke member 29ª when the shaft 29 with the lever member 36 is rotated. The cam member is so shaped that the clutch members 24ª, 24ᵇ will be separated at one extreme of the movement of the shaft 29 and will be engaged at the opposite extremity. The operation of the cam member 36ᵇ is such that the clutch members 24ª, 24ᵇ engage when the frame 27 is lowered and are disconnected as the frame 27 is lifted.

In order to support the disks 139 in any one of a plurality of positions, we have provided two adjustments which permit of the adjustment of the disks in any desired position. On extensions 27ª of the frame 27 are cylindrical threaded ends 27ᵇ upon which are mounted disk adjusters 140 having inner cylindrical surfaces corresponding to the cylindrical threaded ends 27ᵇ. Set screws 140ª provide a means for holding the disk adjusters 140 in place. At the end of the rectangular portion of the extension 27ª is a collar 141 which rests against the shoulders of the rectangular portion 27ª to provide a stop for the disk adjuster 140. The nut 140ᵇ binds the disk adjuster 140 against the collar 141. By loosening the nut 140ᵇ and the set screw 140ª, it will be clear that the disk adjuster 140 may be adjusted at any point throughout 360° with the axis of the end of the extension 27ª as a center.

In an offset position and forming a part of the disk adjuster 140 is one part 142 of a rosette, the complementary part 143 of which carries an axle 144. A disk 139 is mounted to rotate on each of the axles 144. The parts 142, 143 of the rosette are held together by a bolt and nut 145. By loosening this nut and bolt, any desired adjustment about the center of the rosette may be obtained, the teeth of the rosette holding the complementary parts in adjusted position when the nut is tightened.

While the rosette is found to be sufficient for the adjustments in the substantially horizontal planes, it is found to be important to have a finer adjustment for the substantially vertical plane as is provided by the adjustment through the set screw 140ª and the nut 140ᵇ.

By means of this compound adjustment it is possible to either lift the soil, throw it sidewise, throw it sidewise and pack it or pack it, as is desired.

In operation, the operator sits on the seat at the rear of the machine within reach of the hand lever 34 and the fertilizer regulating lever 130. The picker arms 56 with their fingers 58 are within view.

When the beginning of the row is reached, the operator releases the hand lever 34 and places it in its rearward position. This action lowers the frame 27 to place the fertilizer distributor devices and planter boots in position to enter the ground. The movement of the lever 34 also simultaneously operates the driving clutch on each shaft 23 to start the planter and fertilizer mechanisms. The several parts operate and cooperate with each other as has been described in detail until the end of the row is reached. The hand lever 34 is now moved to its forward position to disconnect the clutch and stop the planting and fertilizer distributing devices, raising the ground engaging elements with the frame 27 to road or carrying position. A suitable spring 34ª assists the lever 34 in its lifting operation.

At the beginning of the day's work the lever 130 is set to cause delivery of the correct amount of fertilizer. If for any reason it is desirable to change the amount of fertilizer being delivered, the operator may bend forward and change the adjustment of the lever 130, to cause the delivery of the proper amount.

In addition to the advantages already pointed out, the use of twin-row planting has a distinct advantage over the single row planting because there is a greater proportion of the soil of the planted area within the exclusive reach of any one plant where the twin-row method is used.

For instance, where seed pieces are planted in single rows and the rows are say 36" apart and are spaced 12" apart in the row, the amount of soil or dirt that belongs to each seed piece is represented by an area of 12"×36" or a square area of 432 square inches. It will be noted that this area is long and narrow and contains at its ends much soil not available to the plant roots.

If the seed pieces are spaced 12" apart in twin rows and the space between the sets of twin rows is 36", each seed piece in the twin row would have 18" on one side and 6" in the other three directions. This represents an area of 288 square inches. This latter area is more nearly square and represents a saving of ⅓ of the area for production.

While we have illustrated and described an embodiment of our invention, we desire to have it understood that we do not limit ourselves to the exact showing and that modifications and changes may be made without departing from the spirit of the invention and within the scope of the appended claims.

Having described our invention, what we claim and desire to secure by Letters Patent is:—

1. A potato planter for planting twin-rows simultaneously, comprising a frame, supporting wheels spaced to track in the spaces between the twin rows and potato planter devices for planting two rows of potatoes sufficiently close together to permit the roots of the adjacent rows in a twin-row to intermingle with each other and for the plant branches to come together and means for covering the seed potatoes after they have been deposited.

2. A potato planter for planting rows of a twin-row simultaneously, comprising a frame, supporting wheels spaced to track in the spaces between the twin-rows, a plurality of potato carrying means adjustable relative to each other for carrying potato seeds and, to at will, discharge them in two rows either opposite or in staggered relation to each other in the adjacent rows of the twin-row.

3. A potato planter for planting rows of a twin-row simultaneously, comprising a frame, supporting wheels spaced to track in the spaces between the twin-rows, a plurality of sets of relatively adjustable pickers for separately discharging potato seeds in two rows so that the individual potato seeds will, at will, be in opposite or staggered relation relative to each other in the adjacent rows of the twin-row.

4. A potato planter for planting rows of a twin-row simultaneously, comprising a frame, supporting wheels spaced to track in the spaces between the twin-rows, a plurality of rotating devices, and potato seed carrying and discharging means on the rotating devices, the potato seed carrying and discharging means being relatively adjustable and placed on their respective rotating devices so as to, at will, discharge the potato seeds simultaneously or non-simultaneously.

5. A potato planter for planting rows of a twin-row simultaneously, comprising a frame, supporting wheels spaced to track in the spaces between the twin-rows, a plurality of rotating devices, potato seed carrying and discharging means on the rotating devices, the potato seed carrying and discharging means being relatively adjustable and placed on their respective rotating devices, so as to, at will, discharge the potato seeds simultaneously or non-simultaneously and means for rotating both rotating devices at the same speed.

6. A potato planter comprising a frame, planting means for planting potatoes sufficiently close to permit intermingling of the roots to form twin rows, supporting wheels for the frame and spaced to track in the spaces between the twin-rows, a plurality of sets of carrying and discharging means, power means for driving the carrying and discharging means from respective supporting wheels at the same rate of speed and manually controlled means for releasing the driving means from the wheels, at the will of the operator.

7. A potato planter for planting rows of a twin-row simultaneously, comprising a frame, supporting wheels spaced to track in the spaces between the twin-rows, double furrowing means for throwing the earth to the right and left of the center of the twin-row, fertilizer delivering means mounted in position to deliver fertilizer adjacent the center of the twin-row and at its outer edges, planter shoes in position to form the planting trench, potato seed delivering means to deliver potato seeds behind the shoes, means forward of the seed delivering means to cover the fertilizer and means at the rear of the seed delivering means to cover the seed to the desired depth.

8. A potato planter for planting rows of a twin-row simultaneously, comprising a frame, supporting wheels spaced to track in the spaces between the twin-rows, furrowing means mounted on the frame including means in position to throw the earth to right and left adjacent the outer edges of the twin-row and means for throwing the dirt to right and left adjacent the center of the twin-row, fertilizer delivering means adjacent the furrowing means for delivering fertilizer adjacent the center of the twin rows and for delivering fertilizer adjacent the outer edges of the twin rows and in position to have the outer portions of the fertilizer covered by the inner dirt throwing means, planter shoes in position to form the planting trench and cover the fertilizer deposited adjacent the center of the twin-row.

9. A potato planter for planting rows of a twin-row simultaneously, comprising a frame, supporting wheels spaced to track in the spaces between the twin-rows, furrowing means mounted on the frame including means in position to throw the earth to right and left adjacent the outer edges of the twin-row and means for throwing the dirt to right and left adjacent the center of the twin-row, fertilizer delivering means adjacent the furrowing means for delivering fertilizer adjacent the center of the twin rows and for delivering fertilizer adjacent the outer edges of the twin rows and in position to have the outer portions of the fertilizer covered by the inner dirt throwing means, planter shoes in position to form the planting trench and cover the fertilizer deposited adjacent the center of the twin-row, and disks rearward of the planter shoes for covering the potato seeds.

10. A potato planter for planting rows of a twin-row simultaneously, comprising a frame, supporting wheels spaced to track in the spaces between the twin-rows, furrowing means mounted on the frame including means in position to throw the earth to right and left adjacent the outer edges of the twin-row and means for throwing the dirt to right and left adjacent the center of the twin-row, fertilizer delivering means adjacent the furrowing means for delivering fertilizer adjacent the center of the twin rows and for delivering fertilizer adjacent the outer edges of the twin rows and in position to have the outer portions of the fertilizer covered by the inner dirt throwing means, planter shoes in position to form the planting trench and cover the fertilizer deposited adjacent the center of the twin-row and a press wheel, having a V-shaped tread, in the rear of each shoe, for pressing the dirt covering the potato seeds.

11. A potato planter for planting twin-rows simultaneously, comprising a frame, supporting wheels spaced to track in the spaces between the twin-rows, furrowing means mounted on the frame including means in position to throw the earth to right and left adjacent the outer edges of the twin-row and means for throwing the dirt to right and left adjacent the center of the twin-row, fertilizer delivering means adjacent the furrowing means for delivering fertilizer adjacent the center of the twin-rows and for delivering fertilizer adjacent the outer edges of the twin-rows and in position to have the outer portions of the fertilizer covered by the inner dirt throwing means, planter shoes in position to form the planting trench and cover the fertilizer deposited adjacent the center of the twin-row, and disks outward and rearward of the planter shoes and in position to throw dirt inwardly to cover the potato seeds.

12. A potato planter for planting rows of a twin-row simultaneously, comprising a frame, supporting wheels spaced to track in the spaces between the twin-rows, double furrowing means for throwing dirt to the right and double furrowing means for throwing dirt to the left, fertilizer delivering means for delivering fertilizer to the rear of each member of each double furrowing means and in position to deliver fertilizer adjacent each row of the twin-row and planting means for planting potato seed between each of the two pairs of fertilizer rows and means for covering the potato seed.

13. The method of planting potatoes which comprises planting potato seed in pairs of rows close enough together to form twin-rows and to render cultivation between the rows of a twin-row unnecessary, of placing fertilizer between the two rows of the twin rows and covering the fertilizer and seed with earth.

14. The method of planting potatoes which comprises planting potato seed in pairs of rows close enough together for the roots of the rows to intermingle, and of simultaneously placing a band of fertilizer outward of each row and two bands of fertilizer between the rows of the twin row, the fertilizer-placing being carried on simultaneously with the planting.

15. The method of planting potatoes close together to form twin-rows which comprises the placing of a band of fertilizer outside of the rows of the twin row, of placing a band of fertilizer between the rows of the twin row and planting potato seed between the inner band of fertilizer and each outer band of fertilizer, the fertilizer-placing being carried on simultaneously with the planting.

16. The method of planting potatoes close together to form twin-rows which comprises placing of two bands of fertilizer outside of the rows of the twin row, of placing two bands of fertilizer between the rows of the twin row and planting potato seed between the rows of the twin row and planting potato seed between the inner bands of fertilizer and each outer band of fertilizer, the fertilizer-placing being carried on simultaneously with the planting.

17. The method of planting potatoes close together to form twin-rows which comprises placing of two bands of fertilizer outside of the rows of the twin row, of placing two bands of fertilizer between the rows of the twin row and planting potato seed between the inner bands of fertilizer and each outer band of fertilizer, the seeds of the potato plantings of the different rows of the twin row not being opposite to the nearest potato seed in the other row, the fertilizer-placing being carried on simultaneously with the planting.

18. The method of planting potatoes which comprises planting potato seed in pairs of rows and in separate furrows close enough together to form twin-rows and to render cultivation between the rows of a twin-row unnecessary, the potato seeds of one row being placed in staggered relation to the seeds of the other row of the twin-row.

19. The method of planting potatoes which comprises planting potato seed in staggered relation in a twin-row with the rows of the twin-row so close that the roots of plants in adjacent rows will intermingle, spaced relative to the distance between the individual potato seeds that the distance from any potato seed to adjacent potato seeds of the same row will be substantially the same as the distances from this potato seed to each of the two nearest potato seeds of the other row of the twin-row.

20. The method of planting potatoes which comprises the turning of two furrows outwardly from a line of travel to the right and two furrows outwardly to the left from the line of travel, the depositing of fertilizer in each outer furrow as the furrow is made, the fertilizer being immediately covered by the earth from the corresponding inner furrow, the two pairs of furrows being in close proximity to each other, the depositing of fertilizer in the two close inner furrows, and immediately covering of the two inner furrows, and then the planting of a row of potato seed between the two right rows of fertilizer and a second row of potato seed between the two left rows of fertilizer and finaly covering the potato seed with earth, the two rows forming a single twin row.

21. The method of planting potatoes which comprises the turning of earth outwardly to the right of a line of travel and oppositely outwardly to the left, the depositing of fertilizer immediately where the earth is removed, immediately thereafter covering the fertilizer, the then planting of potato seed close enough to permit the roots to intermingle, the plantings being between the two deposits of fertilizer.

22. The method of depositing of fertilizer for a twin row of potatoes which comprises of the turning of two furrows to the right of a line of travel and two furrows to the left of the line, the immediate placing of fertilizer in the furrows as the dirt is removed, each of the two outer furrows being immediately covered by the dirt removed from the adjacent inner furrow.

23. The method of depositing of fertilizer for a twin row of potatoes which comprises of the simultaneous turning of two furrows to the right of a line of travel and two furrows to the left of the line, the immediate placing of fertilizer in the furrows as the dirt is removed, each of the outer furrows being immediately covered by the dirt removed from the adjacent inner furrow, the inner furrows then being covered.

24. In a potato twin row planter, a frame, a pair of disks on the frame at the right to turn two furrows and a second pair of disks on the frame to throw two furrows to the left, four fertilizer tubes secured to the frame and having their delivery tubes adjacent the rear of the disks respectively and on the concave sides thereof.

25. A potato planter for planting two rows of a twin-row simultaneously, comprising a frame having a main body portion and a movable portion having vertical movement relative to the main body portion, fertilizer delivering means on the movable portion, seed furrow opening and planting devices on the movable portion and lever means for raising and lowering the movable portion with the fertilizer delivering means and planting devices carried thereby.

26. A potato planter for planting two rows of a twin-row simultaneously, comprising a frame having a main body portion and a movable portion having vertical movement relative to the main body portion, fertilizer delivering means on the movable portion having delivery means to deliver fertilizer between the rows of the twin-row and outside of the rows of the twin-row, seed furrow opening devices mounted on the movable portion and a single lever having connections to the movable portions to simultaneously raise or lower the movable portion with the fertilizer delivering means and planting devices carried thereby.

27. A potato planter for planting two rows of a twin-row simultaneously, comprising a frame having a main body portion and a movable portion having vertical movement relative to the main body portion, right and left furrow-opening means on the movable portion, fertilizer delivering tubes immediately in the rear of the furrow-opening means and supported on the movable portions, a pair of seed furrow opening devices on the movable portion and of a distance apart to plant potato seeds close enough together to permit the roots of the adjacent rows, forming the twin row, to intermingle and means for raising and lowering the movable portion relative to the main body portion of the frame.

28. A potato planter for planting two rows of a twin-row simultaneously, comprising a frame having a main body portion and a movable portion having vertical movement relative to the main body portion, right and left furrow-opening means on the movable portion, fertilizer delivering tubes immediately in the rear of the furrow-opening means and supported on the movable portions, a pair of seed furrow opening devices on the movable portion and of a distance apart to plant potato seeds close enough together to permit the roots of the adjacent rows, forming the twin row, to intermingle and a single lever having connections to the movable portion, to raise and lower the latter at will.

29. A potato planter for planting two rows of a twin-row simultaneously, comprising a frame, ground wheels supporting the frame, seed picking and delivering mechanism for selecting and delivering seeds to the rows of the twin row, a pair of fertilizer distributors, means for opening the ground for the deposit of the fertilizer and seeds, means for covering the fertilizer and seed, drive connections between the ground wheels and the fertilizer distributors and picking mechanism respectively and a single control device within reach of the operator for, at will, simultaneously raising or lowering the ground opening and closing means and disconnecting or connecting the ground wheels with the fertilizer distributors and picking mechanism.

30. A potato planter for planting two rows of a twin-row simultaneously, comprising a frame, ground wheels supporting the frame, a pair of seed picking mechanisms for delivering seeds to the respective rows of the twin-row, a pair of fertilizer distributors, means for opening the ground for the deposit of the fertilizer and seed, means for covering the fertilizer and seed, drive connections from the ground wheels to the picking mechanisms and fertilizer distributors, a single control device within reach of the operator for, at will, simultaneously raising or lowering the ground opening and closing means and operatively disconnecting or connecting the ground wheels with the respective fertilizer distributors and picking mechanism.

31. An agricultural implement for preparing rows for potato planting, comprising a frame, furrow turning means for turning closely adjacent right and left furrows, means for turning a furrow between the two first mentioned furrows, and fertilizer delivering means to deliver fertilizer to the furrows.

32. An agricultural implement for preparing rows for potato planting, comprising a frame, furrow turning means for turning closely adjacent right and left furrows, means for turning a furrow between the two first mentioned furrows, fertilizer delivering means to deliver fertilizer to the furrows and means for covering the fertilizer.

33. An agricultural implement for preparing rows for potato planting, comprising a frame, furrow turning means for turning two furrows to the right and a second furrow turning means closely adjacent the first named furrow turning means for turning two furrows to the left, and fertilizer delivering means for delivering fertilizer in all four furrows.

34. An agricultural implement for preparing rows for potato planting, comprising a frame, furrow turning means for turning two furrows to the right and a second furrow turning means closely adjacent the first named furrow turning means for turning two furrows to the left, fertilizer delivering means for delivering fertilizer in all four furrows and means for covering the fertilizer in the furrows.

35. A potato planter for planting rows of a twin-row simultaneously, comprising a frame, supporting wheels spaced to track in the spaces between the twin-rows, double furrowing means for throwing the earth to the right and left of the center of the twin-row, fertilizer delivering means mounted in position to deliver fertilizer adjacent the center of the twin-row and at its outer edges, planter shoes in position to form the planting trench, a groove forming means on the bottom of the planter shoe to form a seed groove to receive the seed, potato seed delivering means to deliver the potato seeds to the groove, means forward of the seed delivering means to cover the fertilizer and means at the rear of the seed delivering means to cover the seed to the desired depth.

36. A potato planter for planting twin-rows simultaneously, comprising a frame, supporting wheels spaced to track in the spaces between the twin rows, furrowing means mounted on the frame including means in position to throw the earth to right and left adjacent the outer edges of the twin-row and means for throwing the dirt to right and left adjacent the center of the twin-row, fertilizer delivering means adjacent the furrowing means for delivering fertilizer adjacent the center of the twin-rows and for delivering fertilizer adjacent the outer edges of the twin-rows and in position to have the outer portions of the fertilizer covered by the inner dirt throwing means, planter shoes in position to form the planting trench and cover the fertilizer deposited adjacent the center of the twin-row, a groove-forming means at the bottom of the planter shoe to form a seed groove to receive the seed, and means rearward of the groove-forming means to cover the groove and seed after the seed has been deposited.

FREDERIC H. BATEMAN.
ISAAC TROLLEY.